United States Patent [19]

Sielcken

[11] Patent Number: 5,620,938
[45] Date of Patent: Apr. 15, 1997

[54] EPOXYDATION CATALYST

[75] Inventor: Otto E. Sielcken, Sittard, Netherlands

[73] Assignee: DSM N.V., Heerlen, Netherlands

[21] Appl. No.: 387,742

[22] PCT Filed: Aug. 16, 1993

[86] PCT No.: PCT/NL93/00172

§ 371 Date: Feb. 17, 1995

§ 102(e) Date: Feb. 17, 1995

[87] PCT Pub. No.: WO94/04268

PCT Pub. Date: Mar. 3, 1994

[30] Foreign Application Priority Data

Aug. 20, 1992 [NL] Netherlands ................ 9201482

[51] Int. Cl.$^6$ ............ B01J 31/16; C07D 301/03
[52] U.S. Cl. ............ 502/152; 502/150; 502/155; 502/158; 502/167; 502/168; 502/242; 502/247; 502/248; 502/254; 502/255; 502/305; 549/523; 549/525; 549/533
[58] Field of Search ............ 502/150, 155, 502/158, 167, 168, 242, 247, 248, 254, 255, 305, 152; 549/523, 525, 533

[56] References Cited

U.S. PATENT DOCUMENTS

| | | | |
|---|---|---|---|
| 3,726,809 | 4/1973 | Allum et al. | 252/431 P |
| 3,829,392 | 8/1974 | Wulff | 252/430 |
| 3,980,583 | 9/1976 | Mitchell et al. | 252/430 |
| 4,134,906 | 1/1979 | Oswald et al. | 260/429 CY |
| 4,873,212 | 10/1989 | Stapersma | 502/158 |
| 5,081,267 | 1/1992 | Rameswaran et al. | 549/529 |
| 5,162,279 | 11/1992 | Miki | 502/158 |
| 5,420,313 | 5/1995 | Cumington et al. | 549/529 |
| 5,430,161 | 7/1995 | Brown et al. | 549/531 |

FOREIGN PATENT DOCUMENTS

| | | |
|---|---|---|
| 0138624A2 | 4/1985 | European Pat. Off. . |
| 0193682A1 | 9/1986 | European Pat. Off. . |
| 0332970A1 | 9/1989 | European Pat. Off. . |
| 0421781A1 | 4/1991 | European Pat. Off. . |

*Primary Examiner*—Shrive Beck
*Assistant Examiner*—Timothy H. Meeks
*Attorney, Agent, or Firm*—Cushman Darby & Cushman IP Group of Pillsbury Madison & Sutro, LLP

[57] ABSTRACT

The invention relates to a catalyst for the epoxidation of alkenes using alkylhydroperoxide, the catalyst comprising an ion of one or more of the metals molybdenum, wolfram, titanium or vanadium on an inorganic carrier, characterised in that the metal ion is bound to the carrier via a polydentate organic ligand.

The invention also relates to a process for the preparation of an alkene oxide by an alkene having 3 or more carbon atoms with an alkylhydroperoxide, using the catalyst described above.

21 Claims, No Drawings

EPOXYDATION CATALYST

FIELD OF THE INVENTION

The invention relates to a catalyst for the epoxidation of alkenes using alkylhydroperoxide, the catalyst comprising an ion of one or more of the metals molybdenum, wolfram, titanium or vanadium on a solid inorganic carrier.

BACKGROUND OF THE INVENTION

Processes are known and practiced commercially for the epoxidation of olefins by catalytic reaction of alkenes with an alkylhydroperoxide. EP-A-193682, for instance, describes the use of molybdenum in a homogeneous catalysed reaction.

Efforts have been made by prior workers to develop heterogeneous catalyst systems useful in such epoxidations which are essentially insoluble in the reaction mixture. EP-A-421781 describes a molybdenum oxide on a solid silica carrier. Such a catalyst presents the drawback that the yield of the epoxidation reaction decreases if the same catalyst is used several times in succession. Furthermore, catalysts of this type are calcined. Calcination often causes sintering of the surface, which makes such a catalyst less readily regenerable. Furthermore, catalyst is lost in regeneration.

SUMMARY AND OBJECTS OF THE INVENTION

The invention provides a solution to these problems by providing a catalyst with which the metal (ion) is bound to the inorganic carrier via a polydentate organic ligand.

The catalyst according to the invention appears to combine a very high activity with a high selectivity in comparison with the catalyst described in EP-A-421781, and to be very stable as well.

The solid carrier is preferably an oxide of silicon, aluminium, titanium, or mixtures hereof; silicon oxide in particular is preferred because it is available in many types.

DETAILED DESCRIPTION OF THE INVENTION

The catalyst of the invention is useful for the epoxidation of alkenes using alkylhydroperoxide. The catalyst comprises an ion of at least one metal which is on a solid inorganic carrier wherein the metal ion is bound to the inorganic carrier by a polydentate organic ligand. The inorganic carrier has polydentate organic ligands to which a suitable selected metal ion is bound. By preference, the metal is molybdenum.

The polydentate ligand is preferably bi-, tri- or tetradentate. With particular preference use is made of di- or tridentate ligands. Higher-dentate ligands may shield the metal ion, which could make it less active.

The ligand preferably has oxygen, nitrogen or sulphur atoms as coordinating atoms for the metal ion. With more preference oxygen and/or nitrogen atoms are chosen. With particular preference the polydentate ligand has at least one coordinating nitrogen atom. The coordinating atoms are preferably in the form of an alcohol group, a ketone group, an aldehyde group, an ether group, a carboxyl group, a primary, secondary or tertiary amine group, an aromatic amine group or a sulphide group.

It is important for the catalyst according to the invention that the polyligand has a great stability with respect to the reaction medium, in this case the alkylhydroperoxide solution at a temperature of usually between 20° and 200° C. To this end it is preferable that the polydentate ligand contains no C=N (imine) or C=C (ethylenically unsaturated) groups.

Preferably the polydentate ligand is bound to a substrate via a siloxane group, the substrate being the inorganic solid carrier.

By preference, the carrier has groups as is shown in Formula (I):

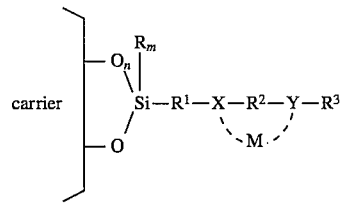

where:
M=a metal chosen from the group comprising molybdenum, wolfram, titanium and vanadium;
n=0, 1 or 2; m=0, 1 or 2, n+m being 2;
R=H or $C_1$–$C_{12}$ alkyl or $C_1$–$C_{12}$ alkoxy;
X,Y=independently of one another O, S or $NR^4$, $R^4$ having the meaning of $R^3$;
$R^1$=$C_1$–$C_{30}$ alkyl, alkaryl, aralkyl or aryl;
$R^2$=$C_2$–$C_{20}$ organic residue optionally with C=O, COOH, COH, $CNHR^4$ groups;
$R^3$=H, $C_{1-8}$ alkyl or $R^5$–Z, $R^5$ having the meaning of $R^2$ and Z having the meaning of X,
where $R^1$ and $R^2$ and/or $R^2$ and $R^3$ can together form a(n aromatic) ring system.

Examples of suitable groups of polydentate ligands are salenes, bipyridines, diethylacetonates and quinolines.

Examples of polydentate ligands are: 2,2'-bipyridine, 1,10-phenanthroline, terpyridine, derivatives of salicylaldehyde, pyridinecarboxaldehyde and thiophene-aldehyde, such as salicylaldehyde-2-hydroxyanile, bisbis-(salicylaldehyde)ethylene diimine. The latter two compounds are preferably used in a hydrogenated form so that the imine functions are hydrogenated.

The metal ion of the catalyst according to the invention is also usually coordinated with a weak coordinating ligand before being fed to the reaction. During the reaction this ligand will dissociate in order to create a free coordinating place on which the reactants can coordinate. The metal ion on the catalyst can be described according to the following formula in which as an example the preferred Mo(IV) oxide is used:

wherein $L^1$ and $L^2$ represent the polydentate organic ligands which ligands are connected in some way to the solid anorganic carrier and $L^3$ represents the weakly coordinated ligand. $L^1$ and $L^2$ can be, for example, X and Y of formula (I).

This weakly coordinated ligand $L^3$ can be every ligand that will dissociate under reaction conditions. Examples of these weakly coordinated ligands are acetyl-acetonate, halogenides like chloride and sulfonate.

Catalysts similar to the catalyst according to the invention are described in EP-A-332970. EP-A-332970 describes a heterogeneous catalyst wherein the active metal is bound to the carrier via a polydentate organic ligand. These catalysts are however catalysts for carbonylation reactions and the catalysts contain noble metals from group VIII. Moreover all the examples in EP-A-332970 describe ligands containing fosfine groups. These fosfine groups will react with alkylhydroperoxide if these catalysts are used in an epoxidation according to the invention and are therefore not suitable as a catalyst for these kind of epoxidation reactions. The polydentate organic ligand according to the invention preferably does not contain fosfine groups.

From EP-A-138624 it is known per se to carry out epoxidation reactions using a catalyst consisting of organic carrier, in particular a styrene divinylbenzene resin with polydentate ligands. In practice this type of carrier appears to be unstable for the reaction medium and therefore such a catalyst is not suitable for commercial application. Surprisingly, it has been found that the catalyst according to the present invention with its organic ligands is still stable.

The invention also relates to a process for the epoxidation of an alkene having 3 or more carbon atoms, under the influence of a catalyst containing a metal ion, with an alkylhydroperoxide, using a catalyst with which an ion of molybdenum, wolfram, titanium or vanadium is bound to inorganic carrier via a polydentate ligand.

Usually a linear, branched or cyclic alkene with 3–30 carbon atoms, preferably 3–18, is chosen as the alkene. Very suitable are for example propylene, 1-butylene, 2-butylene, isobutylene, 1-pentene, 2-pentene, cyclopentene, 1-hexene, 2-hexene, 2-methyl-1-butylene, 3-hexene, 2-methyl-1-pentene, 3-methyl-1-pentene, 1-heptene, 2-heptene, 3-heptene, 1-octene, 2-octene, 2-methyl-1-heptene, 3-methyl-1-heptene, 3-methyl-2-heptene, 3-octene, 4-octene, cyclohexene, cycloheptene, cyclooctene, cyclododecene, styrene, alpha-methylstyrene and vinyl toluene. Furthermore alkenes that are substituted with a hydroxyl group, a carboxyl group or a cyano group can be used. Alkenes containing amide, imide, ether or esters can also be used. Examples of suitable substituted alkenes are allyl alcohol, vinyl ethers, unsaturated fatty acids, unsaturated oils and tetrahydrophthalic anhydride and 1,4-(bistetrahydrophthalimide)butane.

Usually an alkylhydroperoxide having 3–30 carbon atoms, preferably 3–18, is chosen as the alkylhydroperoxide. Very suitable are for example 2-propylhydroperoxide, cyclohexylhydroperoxide, t-butylhydroperoxide, cumylhydroperoxide and ethylbenzenehydroperoxide.

Optionally a hydrocarbon such as cyclohexane, benzene or chlorinated benzene can be used as a solvent. The alkene or the alcohol formed in the oxidation are also very suitable. If use is made of for example t-butylhydroperoxide, t-butanol is a very suitable solvent.

Dependent on the availability of the starting product, either the alkene or the hydroperoxide can be used in excess. The ratio of the two will usually lie between 5:1 and 1:5, preferably between 2:1 and 1:2, in particular between 1.2:1 and 1:1.2. If a solvent is used, it will usually have a volume that is 0.1–10 times that of the reagents.

The epoxidation reaction is usually carried out using 0.0005–0.1 mol of metal complex relative to the alkene. Preferably use is made of 0.005–0.01 mol.

The reaction usually takes place at a temperature of between 0° and 200° C., preferably at a temperature of above 20° C., in particular above 40° C. The temperature is preferably chosen to be lower than 150° C., in particular lower than 100° C.

The reaction can be carried out batch-wise or in continuous mode. For industrial application a continuous embodiment will usually be chosen, for example in a packed-bed reactor.

The reaction can take place at autogenous pressure, but also at elevated pressure, for example between 0.1 and 2 MPa. A pressure higher than atmospheric pressure will be chosen in particular if a component that is gaseous or very volatile at the desired reaction temperature is chosen as the alkene or as the solvent.

The invention will be further elucidated with reference to the following non-limiting examples.

EXAMPLES I AND II AND COMPARATIVE EXPERIMENT A

Coupling of a ligand to an inorganic carrier

In a nitrogen atmosphere 500 ml of methanol was added to 100 g of silica from Grace (type: SG 254 [30–100 microm.; BET 540 $m^2$/]g) at room temperature. This suspension was stirred for 15 minutes. Then 250 g of 3-aminopropyltrimethoxysilane was added. The suspension was stirred for 1 hour at room temperature. After filtration the solids were washed with 200 ml of toluene. This washing was repeated twice. The product was then dried. Then 6.0 g (0.049 mole) of salicylaldehyde in 5 ml of toluene was added dropwise to 40 g of this modified silica (Element Analysis (in mass %): C., 4.6; N, 1.6) in 100 ml of toluene/ethanol (1:1 v/v), in a nitrogen atmosphere, at 90° C. The reaction mixture was heated for 2 hours, after which it was cooled to room temperature, filtered and extracted in refluxing acetone and ethanol. The product (carrier with ligand A) was dried in vacuum at 90° C. The yield was 45 gram.

Preparation of catalyst I

The catalyst was prepared by refluxing 10 g of carrier with ligand A with 3.3 g of $Mo(O)_2$ $(acac)_2$ [acac is the abbreviation for acetylacetonate] in ethanol (in a nitrogen atmosphere) for 4 hours. Then the reaction mixture was cooled, filtered, extracted in refluxing ethanol and dried. 11.2 g of yellow product remained. Catalyst I can be described with the following formula:

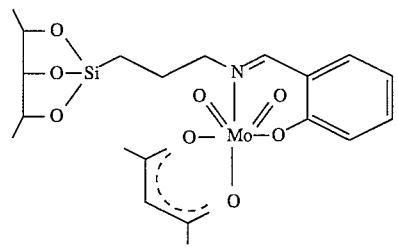

Preparation of catalyst II

The imine functionality of the carrier with ligand a was reduced (to a carrier with ligand b) by adding, in a nitrogen atmosphere, 0.08 g of $NaBH_4$, in small portions, to 0.94 g (=1 mmole of imine) of this silica in 10 ml of ethanol at room temperature. The reaction mixture was heated for 8 hours at 50° C. Then the reaction mixture was cooled to room temperature, filtered, washed using 3 portions of 40 ml of 1N HCl, followed by washing with a diluted $NaHCO_3$ solution, $H_2O$ and ethanol, and then dried. The yield was 0.860 g of product.

The catalyst was then prepared in a manner analogous to that described above using 0.850 g of carrier with ligand b and 0.300 g of $Mo(O)_2(acac)_2$ in ethanol. The yield was 0.944 g.

Element analysis (in mass %): C., 10.3; H, 2.1; N, 1.0; Mo, 6.8. Catalyst II can be described with the following formula:

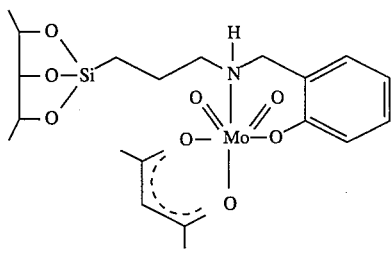

Preparation of catalyst A

Catalyst A, not according to the invention, was prepared by absorbing molybdenum onto silica that had been modified with propylamine as described in the first paragraph of Example I. This carrier hence has mono-dentate ligands. The catalyst was prepared by refluxing 2 g of modified silica with 0.726 g (2.2 mmole) of $Mo(O)_2(acac)_2$ in 20 ml of ethanol, in a nitrogen atmosphere, for 3 hours.

After cooling, filtering and extracting using ethanol 2,267 g of green product was obtained. Element analysis (in mass %): C., 7.2; H, 1.8; N, 1.4; Mo, 5.5.

Examples III–VIII and comparative experiments B and C

Catalytic experiments were carried out by introducing approximately $4\times10^{-5}$ mole of molybdenum complex and approximately 20 mmole of alkene into 6 ml of 1,2-dichloroethane. The reaction mixture was then brought into a nitrogen atmosphere and heated (thermostat temperature: 60° C. for cyclohexene; 80° C. for 1-octene). Then approximately 10 mmole of alkylhydroperoxide was added. Reaction products were characterised with the aid of $^1$H-NMR (after removing the catalyst by filtering the reaction mixture through $Al_2O_3$), GC-MS and gas chromatography (Chrompack 438A using a Spectraphysics SP 4290 integrator; column: carbowax 20M). The reactions were monitored via gas chromatography. During the reactions the peroxide concentrations were spectrophotometrically determined. The peroxide concentration was determined using a predetermined calibration line.

The degree of conversion of hydroperoxide was iodometrically determined after each reaction.

Cyclohexylhydroperoxide and t-butylhydroperoxide were used as alkylhydroperoxides. Cyclohexylhydroperoxide was used as a mixture consisting of 46.5 wt. % cyclohexylhydroperoxide, 20 wt. % cyclohexanol and 13 wt. % cyclohexanone in cyclohexane. t-Butylhydroperoxide was prepared free from water via azeotropic distillation. After all the water had been removed, 1,2-dichloroethane was added to the residue until a solution of 58 wt. % was obtained.

Epoxidation reactions were carried out using cyclohexene and 1-octene as the alkene (alkenes obtained from Aldrich p.a.).

The results are shown in Tables 1 and 2 (see below).

Tables 1 and 2 show that catalyst II almost quantitatively epoxidizes cyclohexene and 1-octene with t-butylhydroperoxide and yields better results than catalyst I or catalyst A.

With catalyst I slightly lower degrees of conversion and lower selectivities are obtained than with catalyst II. With this compound the imine was found to hydrolyse during the reaction, as a result of which molybdenum could be rinsed from the catalyst.

Catalyst A with $Mo(O)_2(acac)$ is also selective but it is much slower than catalyst I or catalyst II.

Table 2 shows that the epoxidation of 1-octene using catalyst II and t-butylhydroperoxide leads to very high degrees of conversion and selectivities. The only byproduct obtained was 2-octene oxide (approx. 3%). 3-octene oxide was not observed. Catalyst II was found to be a very stable complex under the reaction conditions.

In experiments with catalyst II and cyclohexylhydroperoxide carried out in cyclohexane the following results were obtained: with cyclohexene a degree of conversion of 90% and a selectivity of 99% was obtained and with 1-octene a degree of conversion of 45% and a selectivity of 95%. The replacement of 1,2-dichloroethane as the solvent by cyclohexane caused a slight reduction in the degree of conversion but it did not affect the selectivity.

TABLE 1

Epoxidation of cyclohexene using molybdenum on a carrier.

| experiment | catalyst | peroxide | t (min.) | degree of conversion of peroxide | degree of conversion of alkene | selectivity towards epoxide |
|---|---|---|---|---|---|---|
| B | A | t-BuOOH* | 360 | 85 | 88 | 97 |
| III | I | t-BuOOH | 250 | 65 | 76 | 99 |
| IV | II | t-BuOOH | 210 | 99 | 99 | 100 |
| V | II | CyOOH** | 240 | 90 | 95 | 99 |

*t-butylhydroperoxide;
**cyclohexylhydroperoxide

TABLE 2

Epoxidation of 1-octene using molybdenum on a carrier.

| experiment | catalyst | peroxide | t (min.) | degree of conversion of peroxide | degree of conversion of alkene | selectivity towards epoxide |
|---|---|---|---|---|---|---|
| C | A | t-BuOOH | 480 | 63 | 92 | 89 |
| VI | II | t-BuOOH | 200 | 99 | 94 | 97 |
| VII | I | CyOOH | 320 | 95 | 57 | 85 |
| VIII | II | CyOOH | 240 | 98 | 52 | 94 |

I claim:

1. A catalyst for the epoxidation of alkenes using alkylhydroperoxide comprising molybdenum (IV) oxide, on a solid inorganic oxide carrier, wherein the molybdenum oxide is bound to the inorganic carrier via a polydentate organic ligand and is coordinated in the following manner:

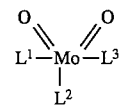

wherein $L^1$ and $L^2$ represent the polydentate organic ligand bound to the solid inorganic carrier and wherein $L^3$ represents a weakly coordinated ligand.

2. A catalyst according to claim 1, wherein the solid inorganic oxide carrier comprises an oxide of silicon, aluminum, titanium or mixtures thereof.

3. Catalyst according to claim 1 or claim 2, characterised in that the polydentate organic ligand is a bi-, tri- or tetradentate ligand.

4. A catalyst according to claim 1, wherein the polydentate organic ligand is at least bidentate, and has oxygen, nitrogen or sulphur atoms as coordinating atoms.

5. A catalyst according to claim 4, wherein said coordinating atoms are contained in an alcohol, ether, ketone, aldehyde, carboxyl, primary, secondary or tertiary amine, aromatic amine or sulphide.

6. A catalyst according to claim 1, wherein the polydentate organic ligand is at least bidentate, and has no C=N or C=C groups.

7. A catalyst for the epoxidation of alkenes using alkylhydroperoxide comprising an molybdenum (IV) oxide on a solid inorganic oxide carrier, wherein the molybdenum (IV) oxide is bound to the inorganic oxide carrier by a polydentate organic ligand, and said solid inorganic carrier has groups represented by the formula:

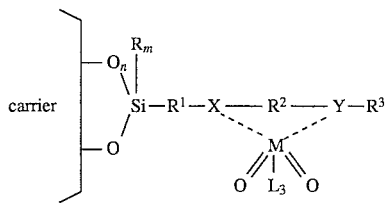

wherein n is 0,1 or 2; m is 0, 1 or 2, and n+m is 2;

R represents H, or $C_1$–$C_{12}$ alkyl or $C_1$–$C_{12}$ alkoxy;

X, Y, independently of one another, represent O, S or $NR^4$, wherein $R^4$ has the meaning of $R^3$ hereinbelow;

$R^1$ represents a $C_1$–$C_{30}$ alkyl, alkaryl, aralkyl or aryl;

$R^2$ represents a $C_2$–$C_{20}$ organic residue, optionally with C=O, COOH, COH or $CNHR^4$ groups;

$R^3$ represents H, $C_{1-8}$ alkyl or $R^5Z$, $R^5$ having the meaning of $R^2$ and Z having the meaning of X, wherein $R^1$ and $R^2$ and/or $R^2$ and $R^3$ can together constitute a ring system and $L_3$ represents a weakly coordinated ligand.

8. A process for the preparation of alkene oxide by epoxidizing an alkene having 3 or more carbon atoms with an alkylhydroperoxide under the influence of a metal-complex catalyst containing molybdenum (IV) oxide on a solid inorganic oxide carrier, wherein the molybdenum (IV) oxide is bound to the inorganic carrier via a polydentate organic ligand and is coordinated in the following manner:

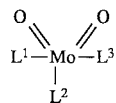

wherein $L^1$ and $L^2$ represent the polydentate organic ligand bound to the solid inorganic oxide carrier and wherein $L^3$ represents a weakly coordinated ligand.

9. A process according to claim 8, wherein the epoxidizing is carried out in the presence of 0.005–0.01 mole of metal complex relative to the alkene.

10. A process according to claim 8, wherein the epoxidizing is conducted at a temperature between 20° C. to 150° C.

11. A process according to claim 8, wherein said solid inorganic carrier is an oxide of silicon, aluminum, titanium or a mixture thereof.

12. A process according to claim 8, wherein the epoxidizing is carried out in the presence of 0.005 to 0.01 mole of metal complex relative to the alkene, and is temperature conducted at a temperature of between 20° C. to 150° C.

13. A process according to claim 8, wherein the alkene has 3 to 30 carbon atoms.

14. A process according to claim 13, wherein said alkene is at least one selected from the group consisting of propylene, 1-butylene, 2-butylene, isobutylene, 1-pentene, 2-pentene, cyclopentene, 1-hexene, 2-hexene, 2-methyl-1-butylene, 3-hexene, 2-methy-1-pentene, 3-methyl-1-pentene, 1-heptene, 2-heptene, 3-heptene, 1-octene, 2-octene, 2-methyl-1-heptene, 3-methyl-1-heptene, 3-methyl-2-heptene, 3-octene, 4-octene, cyclohexene, cycloheptene, cyclooctene, cyclododecene, styrene, alpha-methylstyrene and vinyl toluene.

15. A process according to claim 8 or 13, wherein the alkylhydroperoxide has 3 to 30 carbon atoms.

16. A process according to claim 15, wherein said epoxidation reaction is conducted at a temperature of between 0° C. to 200° C. using 0.0005–0.1 mol of the metal complex relative to the alkene.

17. A process according to claim 8 or 13, wherein the alkyl hydroperoxide is 2-propylhydroperoxide, cyclohexylhydroperoxide, t-butylhydroperoxide, cumylhydroperoxide, or ethylbenzenehydroperoxide.

18. A process according to claim 8, wherein the alkylhydroperoxide has 3–18 carbon atoms.

19. A process according to claim 8, wherein the alkene is substituted with a hydroxyl group, a carboxyl group, or a cyano group.

20. A process according to claim 8, wherein the alkene is a linear, branched or cyclic alkene with 3 to 18 carbon atoms.

21. A process according to claim 8, wherein $L^3$ represents acetylactonate, halogenide, or sulfonate.

* * * * *